Nov. 13, 1962 A. B. HUBBARD 3,063,287
DENSITOMETER
Filed July 24, 1959 3 Sheets-Sheet 2
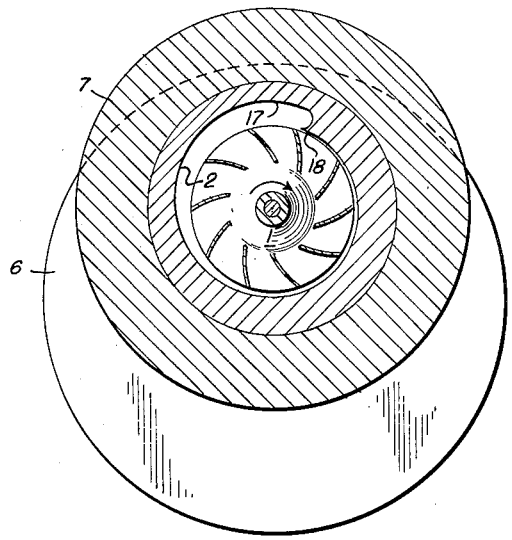
FIG. 2
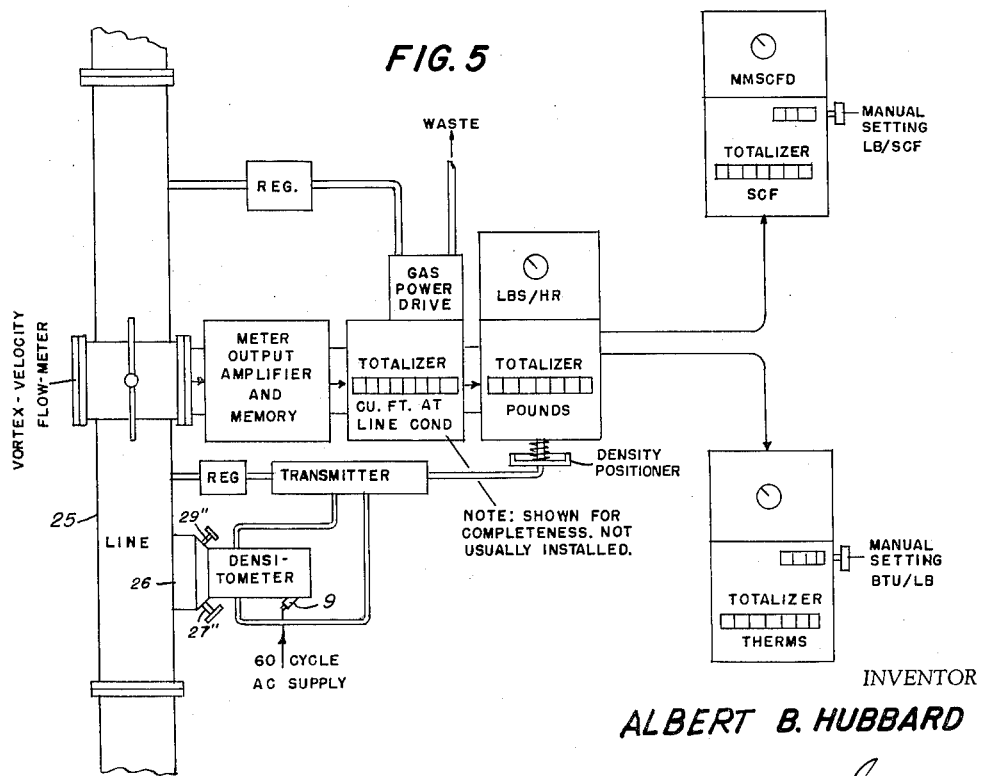
INVENTOR
ALBERT B. HUBBARD
BY Harry A. Smith
ATTORNEY Nov. 13, 1962   A. B. HUBBARD   3,063,287
DENSITOMETER
Filed July 24, 1959   3 Sheets-Sheet 3

INVENTOR
ALBERT B. HUBBARD
BY Harry A. Smith
ATTORNEY

United States Patent Office 3,063,287
Patented Nov. 13, 1962

3,063,287
DENSITOMETER
Albert B. Hubbard, Woodstock, N.Y., assignor to Rotron Research Corporation, Woodstock, N.Y., a corporation of New York
Filed July 24, 1959, Ser. No. 829,369
5 Claims. (Cl. 73—30)

This invention relates to metering devices and more especially to metering devices for gases.

In order to determine, for instance, the weight of gas flowing through a pipe line, it is necessary to know, not only the volume of gas that is flowing through the pipe line, but the density of the gas. The subject matter of the present application is a meter by which the instantaneous density of the gas is determined and may be made available as a factor for use with a volume measuring meter such as a vortex-velocity meter manufactured by Rotron Controls Corp., of Woodstock, New York.

The density of gas, as is well known, is dependent on its chemical make-up, the pressure, and the temperature. The density is, of course, independent of the volume of gas.

The chemical make-up of natural gas does not vary greatly and, as will be seen later, its variation will automatically be taken care of. The pressures and temperatures at which the gas flows past a given point in a pipe line at which a meter may be placed may vary widely, and may vary from moment to moment. Because of this it is customary for gas line operators to maintain a staff of personnel to compute the weight of gas that has passed through the pipe line.

It is a primary object of the present invention therefore to provide a meter which will determine the density of a gas at any temperature and pressure, and which upon variation of either or both of the pressure or temperature will readjust itself to give, at all times a reading of the density of the gas at that particular instant, regardless of whether the gas is at rest or in motion.

The new densitometer herein described consists of a sampling blower driven at constant speed and close-coupled to the gas line or container, through a fixed circulating system. Fan and blower designers rely on a series of Fan Laws which relate characteristic dimensions and fluid properties. These Laws are strictly correct unlike many engineering formulas which are subject to so many qualifications that they become merely approximations. The Fan Law on which the densitometer is based says that a given fan at constant speed and coupled to a fixed "system" (physical arrangement of pipes, ducts, and resistances to flow) will produce a pressure differential proportional to fluid density.

Other and further objects and advantages of the densitometer will appear from the following description taken with the accompanying drawings in which like characters of reference denote similar parts in the several views and in which:

FIG. 2 is a section taken at 2—2 of FIG. 1;

FIG. 5 is a block diagram showing a complete mass metering system and showing how the densitometer of the present invention is incorporated in such a system.

Figure 1:
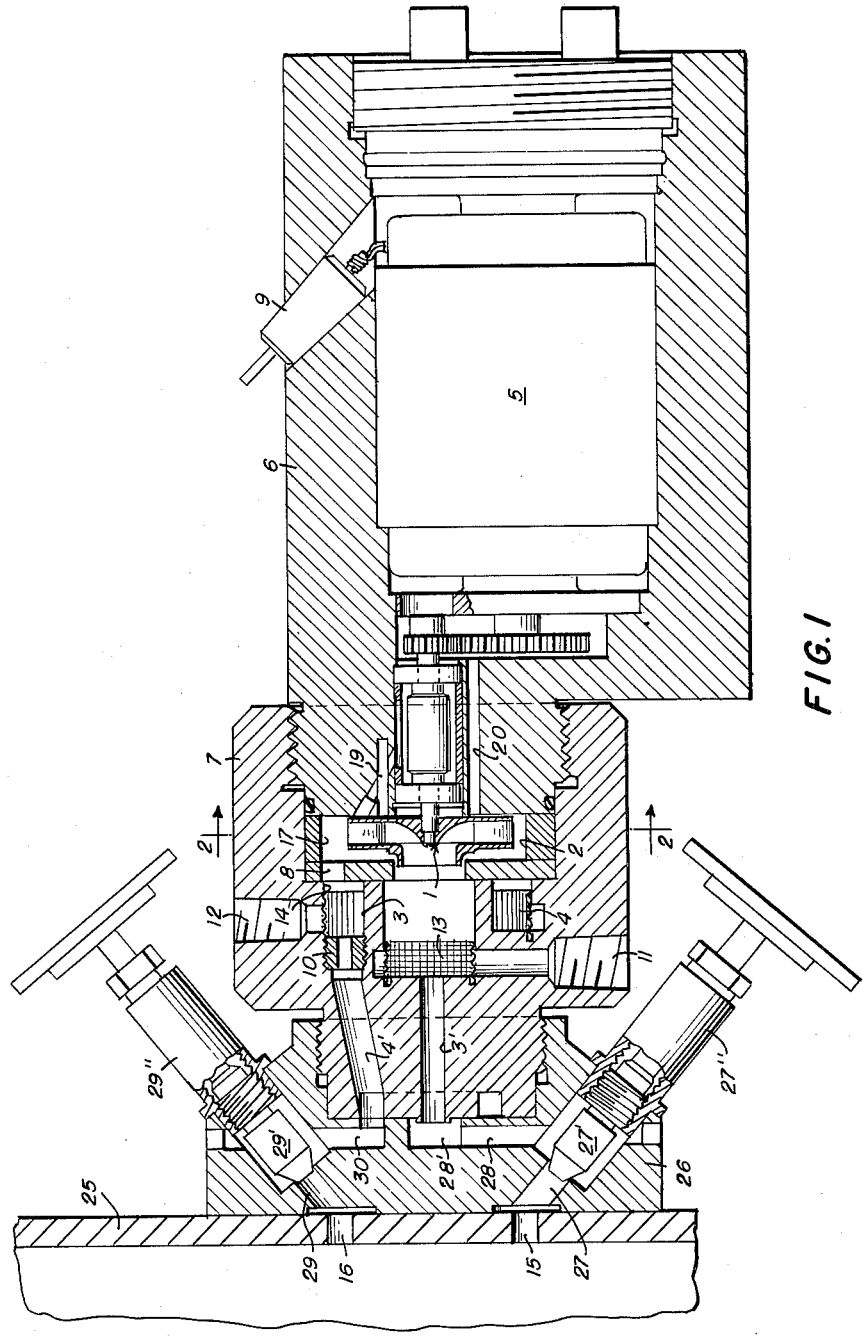
FIG. 1 is a longitudinal section of an exemplification of the device.

Referring to FIGS. 1 and 2 it will be seen that a paddle wheel 1 operates within a developed scroll 2, the combination acting as a centrifugal pump. The gas is sucked from the entrance chamber 3 and delivered into the exit chamber 4 which is annularly disposed around 3 and connected to the scroll chamber by passage 8 parallel to the axis of paddle wheel 1. The paddle wheel 1 is driven by the constant speed synchro-electric motor 5 or by any other suitable constant speed drive such as, for example, a constant speed gas turbine which could be powered by gas under pressure from the same gas pipeline as that of which the densitometer is measuring the density.

The paddle wheel may be driven directly by the electric motor or through reduction or speed-up gears from the motor depending upon the diameter chosen for the wheel, the density of the gas, and the desired output differential pressure. In FIG. 1 a speed-up gearing is shown. The electric motor 5 together with all mechanical moving parts is housed in a single casing 6, whereas all gas chambers and passages are grouped in a second casing 7. The two casings are held together by a screw connection which allows quick disengagement and inspection of all parts. The said two casings constitute the densitometer which may be screwed into a socket or saddle which is welded onto the pipeline or gas containing vessel. The electrical connections to the driving motor are made by high-pressure insulating terminals 9. This compact construction allows the assembly to be readily built to withstand great static pressures as may be encountered in gas pipeline service. Passages 19 and 20 provide by-passes for the gas around the bearings.

The accuracy of the differential pressure signal developed by a densitometer of this type and therefore the accuracy of the device as a densitometer will depend only on two circumstances, firstly the accuracy with which the speed of the motor can be kept constant and secondly the successful elimination of extraneous influences upon the pressure differential developed by the pump and sensed by the differential pressure measuring device. The first requirement can be met easily by the use of a synchronous electric motor driven from present-day power company utility supply lines, which are customarily kept to a very high degree of accuracy in order to allow the use of electric time clocks. Motor 5 is such a motor.

Figure 3:
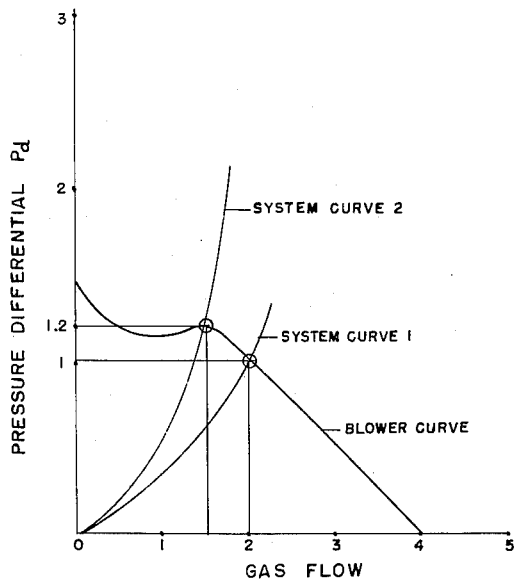
FIG. 3 is a typical performance curve of a centifugal blower and two curves of pressure drop through two different piping systems.

In FIG. 3 is shown a typical performance curve of a centrifugal blower as well as two typical system curves representing the pressure drop in two different piping systems, as a function of flow, system 2 having slightly higher resistance than system 1. When the particular centrifugal blower is connected to either of the piping systems, a flow will obtain as represented by the intersection of the blower curve with the particular system curve. It will be seen that with the piping system of curve 1, the blower will operate at a differential pressure of 1, and with the piping system of curve 2, the blower will operate at the higher differential pressure of 1.2. Both operating conditions pertaining to the use of gas of the same density, it is obvious then that any change in the resistance of the piping system will produce a different differential pressure over the blower, even when the gas density has not changed and will hence introduce an error.

In a densitometer of the type described it is therefore of prime importance that the resistance of the piping system, that is, the resistance of the gas sampling line leading to and from the blower, is kept very constant. In practice this appears to be impossible to achieve because over a period of operation small deposits of matter entrained by the gas are found to result in slight changes in the resistance of the sampling line. Introduction of a filter media in the sampling piping system to trap such deposits would only make matters worse because the increasing pressure drop over the filter with increasing pullution would slowly diminish the flow.

Besides pollution there is another circumstance which in practice may vary the rate of sampling flow and that is variation in flow pattern inside the sampling line with variations in density. It is well known that the characteristic resistance of a piping system varies with the so-called Reynolds number, which in turn is governed by the gas density. The present invention avoids this influence by virtually concentrating the system resistance at a single point, by the use of a restricting nozzle 10. This nozzle is dimensioned so small that a very high gas velocity ensures correspondingly high Reynolds number, whereby variations in density and subsequent changes in Reynolds number cease to influence the flow pattern and hence the pressure drop in the sampling piping system.

Another circumstance which may cause errors in a pressure measuring device is the action of flow on imperfect pressure measuring wall taps in the wall of a pipe through which a gas flows. It is well known in the art of gas measurement that small burrs and nicks at such wall taps may introduce variations in the pressure measured by means of such taps, when the velocity of flow in the pipe varies or the pattern of flow in the pipe varies. For this very reason, the present invention avoids taking pressure differential measurements over wall taps as shown typically in FIG. 3. Instead, a chamber is formed at both entrance 3 and discharge 4 of the blower and the gas is allowed to slow down in these chambers to the point where no velocity effects on the taps can occur and the pressure differential taps to the measuring device are taken at these chambers by means of piping connections 11 and 12. A further refinement is that fine mesh screens 13 and 14 are interposed between the area where the pressure taps are located and where the entrance and exit openings occur to and from these plenum chambers.

We have previously seen that slight variations in sampling gas flow may give undue variations in the pressure differential over the blower wheel. We shall return to this later.

With this scheme there are still required two taps, 15 and 16, in the pipe as shown in FIG. 1 but any erratic behavior at these taps now no longer influences, in any direct manner, the pressure differential which is sensed over the sampling blower by the differential pressure measuring device. There remains, however, a secondary effect. Any spurious positive or negative pressure produced at the taps in the pipe by the rapidly flowing gas in the pipe will add or subtract to the total pressure drop in the sampling piping system and will therefore change the volume of the sampling flow by the blower.

Figure 4:
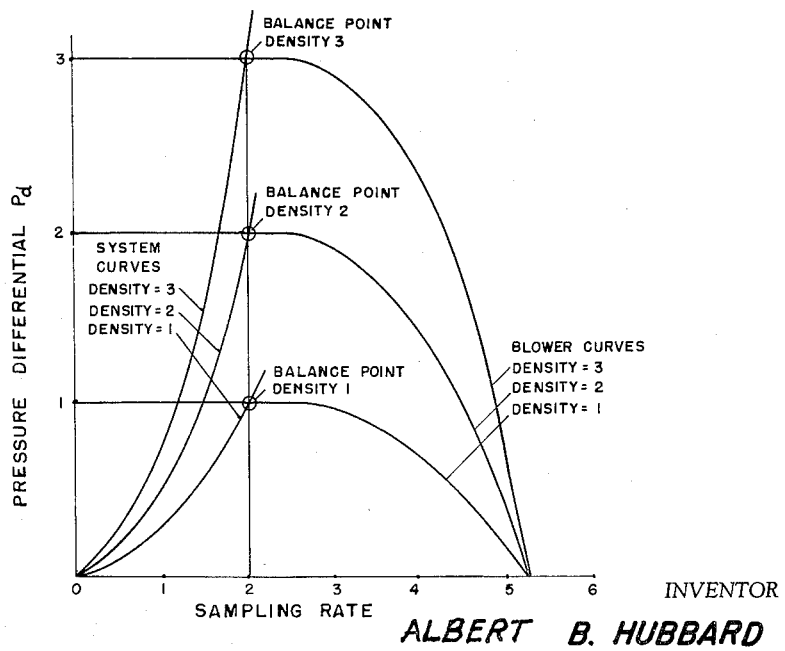
FIG. 4 is a graphic representation of the effect of changing density in the device of the present invention.

There thus remain two effects which are likely to unduly influence the sampling flow and hence impair the accuracy of the instrument. One is the change in flow due to deposits in the sampling piping and the other is the change in flow due to spurious pressures due to eddy currents in the pipe line at the pipe taps. In the present invention these two effects are overcome by a special design of the blower, whereby the blower exhibits a horizontal or flat section in its pressure-volume performance curve, or in other words, the blower pressure differential is constant over a certain range of sampling rates. FIG. 4 is a graphic representation of the effect, on a blower and a system, of changing density. In the arbitrary units of FIG. 4, a parabola correctly represents pressure loss versus flow in the system when density is 1. Another curve shows $P_d$ produced by the blower at various flows when density is 1. Since pressure and flow in blower and system must be the same, the balance point is where the two curves cross. The figure is drawn so that the balance point is at $P_d=1$ and sampling rate=2. When density is 2, both blower and system curves are doubled in height. The new crossing point is at $P_d=2$ while sampling rate is still 2. Similarly, when density=3, $P_d=3$ and sampling rate again remains at 2.

With a blower of this design it is now only necessary to insure that the resistance of the sampling piping system is such that the sampling flow rate corresponds to approximately the midpoint of the "flat" portion in the blower performance curve. This can be readily achieved by proper dimensioning of the previously mentioned concentrated restriction 10 in the sampling piping system. A practical procedure is to install a holed plate or jet at that point. In FIG. 1 this takes the shape of a button 10 which can be screwed in place and easily interchanged.

The "flat" portion in the blower performance curve is obtained by a combination of several construction features. With reference to FIG. 1, we first of all provide a scalloped cut-off section in the blower scroll at the exit point 8, then we provide a fine clearance between the wheel periphery and the cut-off section 18 of the scroll only 2 or 3% of the wheel diameter and finally we provide for a scroll development which is at least 60% of the wheel diameter at its widest point indicated by 17 in FIG. 1. This is measured at coincident radii so that the scroll has a radius greater than 60% of the paddle wheel radius at its widest point.

The pipe, conduit or tank wall 25 from which the continuous sample is drawn is provided with an intake aperture 15 and a return aperture 16. A saddle fitting 26 is mounted on wall 25 and is secured in place by any suitable conventional means. A passage 27 in saddle fitting 26 connects with aperture 15 and may be closed off by a valve head 27' operated by a screw threaded stem in threaded element 27''. A passage 28 leads from valve 27' to a central chamber 28'. Similarly a passage 29 in saddle fitting 26 connects with aperture 16 and may be closed off by a valve head 29' operated by a screw threaded stem in threaded element 29''. From the valve 29' a passage 30 heads to a bore parallel to but spaced from the central chamber 28'.

Passage 3' leads from entrance chamber 3 along the axis of casing 7 and, when casing 7 is screwed into saddle fitting 26, passage 3' is connected to chamber 28'. Passage 4' leading from exit chamber 4 is formed at its end as an annular groove so that it will always be connected to passage 30 regardless of the position of casing 7 in saddle fitting 26.

With respect to the use of the desitometer it will be noted that the pressure differential between plenum chambers 3 and 4 may be measured by connecting any pressure differential measuring device to take off taps 11 and 12. Any differential pressure measuring device may be used and such device is not part of the present invention. Such devices may be, for instance, manometers, or flexible diaphragms, and since the pressure differential is a measure of the density of the gas in the system, any such device may be calibrated to read directly in terms of density or may be made to influence a computing machine, along with other metering devices that measure, for instance, cubic feet at line conditions, to introduce the factor of density of the gas being metered so that the computing machine may determine the total weight of gas flowing in a pipe line.

In FIGURE 5 the use of the densitometer in metering system is illustrated. The difference of pressure between plenum chambers 3 and 4 is measured by the device labeled "transmitter" in FIG. 5 that through other means, not part of this invention, actuate the "density positioner." Since the cubic feet flowing at line conditions is determined continuously, and the density is determined continuously, these two factors are combined by the "Totalized Pounds" device which is a mechanical or electrical computer, to give a continuous reading of the mass of gas flowing in the pipe line.

The description above is of a specific embodiment of the invention and is not to be considered as being limiting. The device is capable of being changed and modified, and variations in the arrangement of the various cooperating parts may be made without departing from the scope of the invention as defined in the following claims:

I claim:
1. A device to determine the density of gas in a container such as a pipe, comprising a housing, a chamber formed by said housing, a paddle wheel rotatably mounted within said chamber and forming a centrifugal pump therewith, an inlet side of said chamber, an outlet side of said chamber, an inlet passage leading from said container to the inlet side of said chamber, a discharge passage leadnig from the outlet side of said chamber to said container, a constant speed motor drivingly connected to said paddle wheel, a differential pressure measuring device, a plenum chamber provided in said inlet passage adjacent said chamber, a second plenum chamber provided in said outlet passage adjacent said chamber and pressure connections leading from said first and second plenum chambers to said differential pressure measuring device.

2. A device to determine the density of gas in a container in accordance with claim 1 in which a nozzle of relatively small dimension is provided in the inlet passage.

3. A device to determine the density of gas in a container in accordance with claim 2 in which the nozzle is sufficiently small in diameter to represent substantially all of the system resistance to gas flow.

4. A device to determine the density of gas in a container such as a pipe, comprising a developed scroll forming a chamber, a paddle wheel rotatably mounted within said chamber with its periphery spaced adjacent the least radius of said scroll and the least radius of the scroll is less than three percent of the paddle wheel diameter and the scroll has a radius greater than 60 percent of the paddle wheel radius at its widest point, said paddle wheel and said scroll forming a centrifugal pump, a chamber inlet, a chamber outlet, an inlet passage leading from said container to said chamber inlet, a discharge passage leading from said chamber outlet to said container, a constant speed motor drivingly connected to said paddle wheel, a differential pressure measuring device, and pressure connections leading from said chamber inlet and said chamber outlet to said differential pressure measuring device, said scroll being provided with a scalloped cut-off section at the chamber outlet, the axis of which is parallel to the axis of the paddle wheel.

5. A device to determine the density of gas in a container in accordance with claim 4 in which the inlet passage to the chamber and the discharge passage from the chamber are each provided with a plenum chamber to which said pressure connections are connected.

References Cited in the file of this patent

UNITED STATES PATENTS

| | | |
|---|---|---|
| 1,664,752 | Konig | Apr. 3, 1928 |
| 2,035,039 | Adams et al. | Mar. 24, 1936 |
| 2,847,850 | Spink | Aug. 19, 1958 |
| 2,948,524 | Sweeney et al. | Aug. 9, 1960 |
| 2,775,122 | Smith et al. | Dec. 25, 1961 |

FOREIGN PATENTS

| | | |
|---|---|---|
| 662,893 | Germany | July 23, 1938 |